Jan. 13, 1953  E. MURPHY  2,625,289
WATER TROUGH
Filed March 7, 1949  2 SHEETS—SHEET 1

INVENTOR.
EMANUEL MURPHY
BY
Robt J Woodward
ATTY.

Jan. 13, 1953  E. MURPHY  2,625,289
WATER TROUGH
Filed March 7, 1949  2 SHEETS—SHEET 2
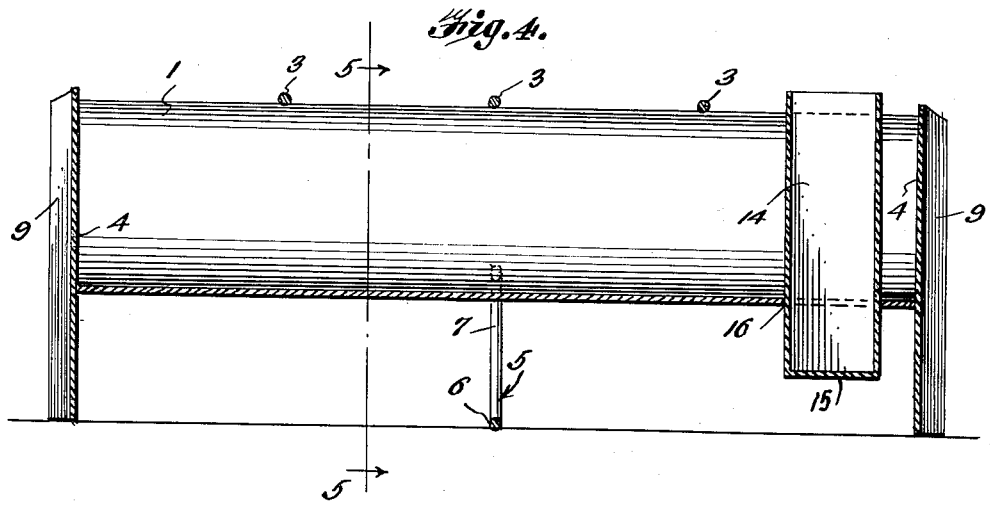
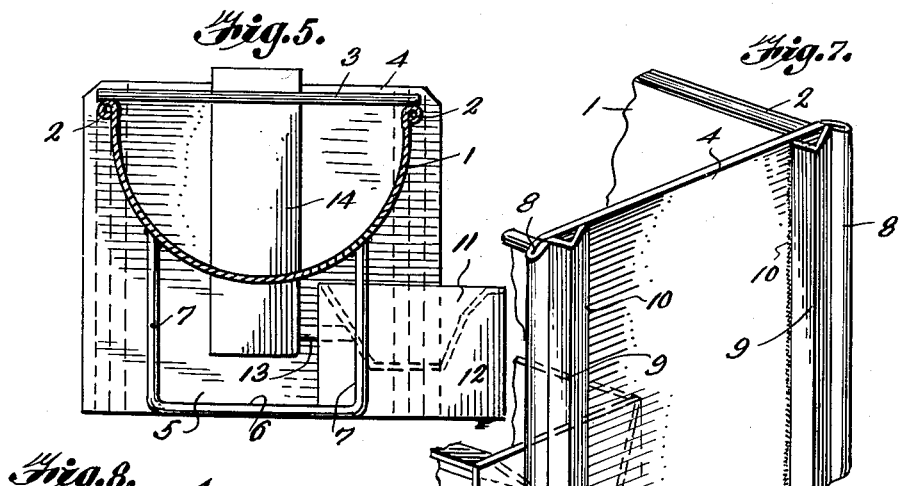
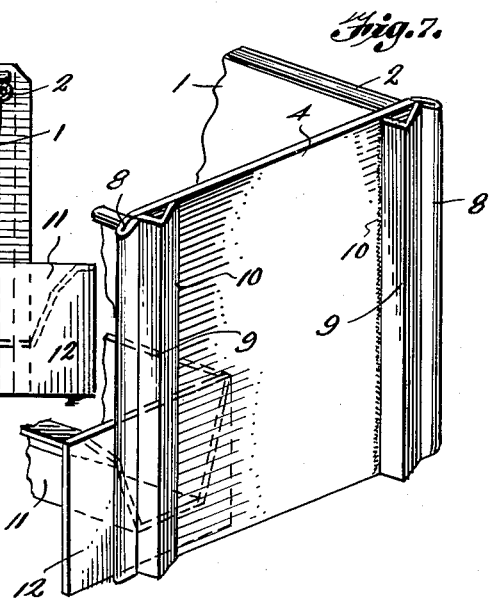
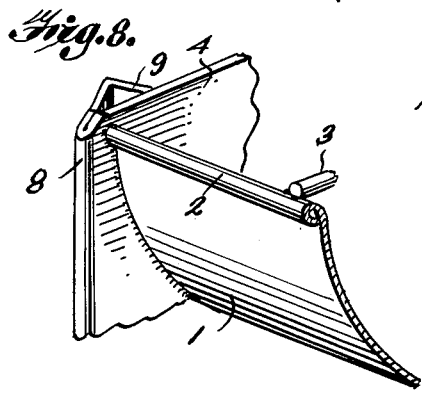
INVENTOR.
EMANUEL MURPHY
BY
Harold L. Woodward
ATTY.

Patented Jan. 13, 1953

2,625,289

UNITED STATES PATENT OFFICE 2,625,289

WATER TROUGH

Emanuel Murphy, Logansport, Ind.

Application March 7, 1949, Serial No. 79,965

1 Claim. (Cl. 220—4)

This invention relates to a water trough which is particularly adapted for use in supplying water to horses, cattle, and other large animals, it being one object of the invention to provide a trough which is formed of sheet metal and may therefore be manufactured at low cost.

Another object of the invention is to provide a trough having a body provided with end walls which extend downwardly below the bottom of the trough and serve not only as end walls but also as supports which cooperate with a support midway the length of the trough and prevent the bottom of the trough from resting upon the ground and becoming rusted by water gathering under the trough.

Another object of the invention is to provide a trough having end walls of such width that they will project from sides of the trough and very effectively prevent the trough from being tilted transversely and overturned if animals step in the trough.

Another object of the invention is to provide the end walls with side edge portions so bent that they form outstanding ribs which rest upon the ground and serve to prevent the said end walls from being forced into the trough as well as serving as vertically extending reinforcements for side edges of the end walls.

Another object of the invention is to provide a trough which is braced against transverse spreading by rods spaced from each other longitudinally of the trough and are disposed in crossed relation to the trough with their ends welded to upper edges of opposite sides of the trough.

Another object of the invention is to provide a trough having associated with it an auxiliary trough located under a side portion of the trough and serving as a container for water to be consumed by small animals, the auxiliary trough being filled through a chute mounted vertically through the main chute.

The invention is illustrated in the accompanying drawings wherein:

Fig. 4 is a sectional view taken longitudinally through the trough along the line 4—4 of Figure 1.

Fig. 5 is a transverse sectional view taken along the line 5—5 of Figure 4.

Fig. 7 is a fragmentary perspective view looking at the outer face of one end of the trough.

Fig. 8 is a fragmentary perspective view looking at the inner face of a side portion of one end of the trough.

Figure 1:
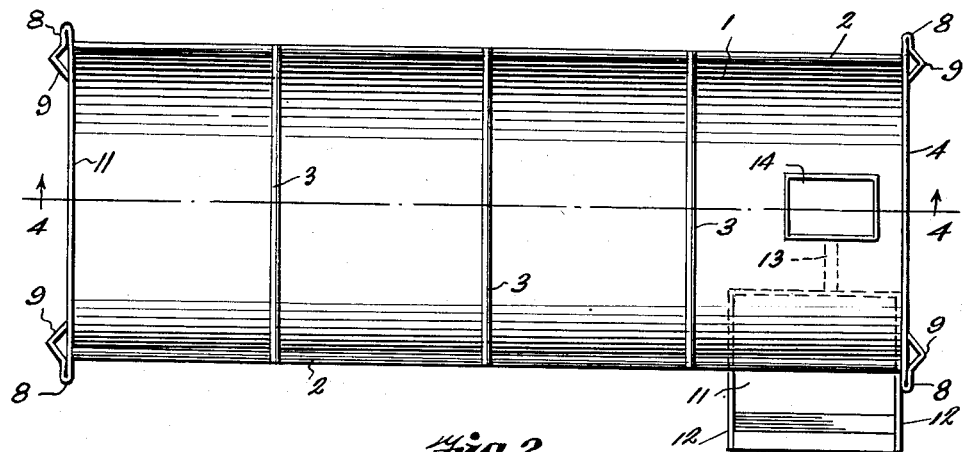
Fig. 1 is a top plan view of the improved water trough.
Figure 2:
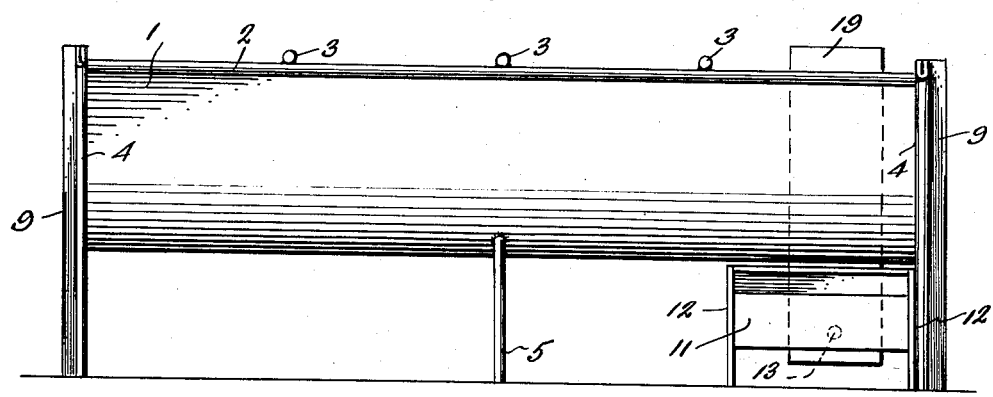
Fig. 2 is a side elevation of the trough.
Figure 3:
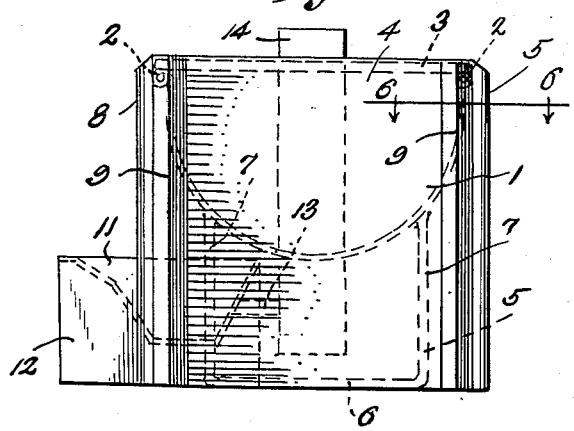
Fig. 3 is a view looking at one end of the improved trough.
Figure 6:
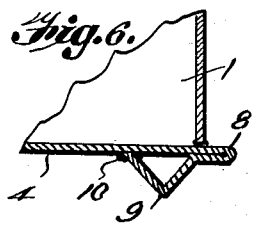
Fig. 6 is a fragmentary sectional view taken through a corner portion of the trough along the line 6—6 of Figure 3.

This improved trough is particularly useful for supplying water to horses, cattle, and other large animals but it will be understood that it may be of any dimensions desired to accommodate it to the use to which it is to be put. The trough has a body 1 which is formed of sheet metal and may be of a length and width desired. The body has a transversely arcuate bottom merging into side walls and upper edges of the walls are rolled outwardly to form beads 2 which reinforce the edges of the trough and also prevent an animal from being cut by contact with edges of the body while drinking from the trough. Rods 3 which are spaced from each other longitudinally of the trough extend across the body and have their ends welded to the rolled edges thereof so that they serve as braces to prevent transverse spreading of the body and also afford hand holds by means of which the trough may be conveniently lifted and carried from one place to another.

Ends of the body are closed by end walls 4 which are also formed of sheet metal and are welded to ends of the body. The end walls are of greater depth than the body and project downwardly therefrom so that when the trough is set at rest upon the ground it will have lower ends of its end walls in contact with the ground and its body supported in upwardly spaced relation to the ground. Therefore water will be prevented from gathering under the bottom of the body and causing the body to have holes formed therein by rust. There has also been provided an auxiliary support 5 for the body midway the length thereof and formed from a rod of stiff metal which is bent to form the support with a bridge 6 at its lower end for resting upon the ground and arms 7 projecting upwardly from the bridge and welded to the under face of the body near opposite sides thereof. Referring to figure 5 it will be seen that the end walls project from opposite sides of the body to such an extent that they will brace the body against transverse tilting and the trough will therefore be prevented from being turned over if animals drinking from the trough place their feet in the trough. Opposite side edge portions of the metal sheets from which the end walls are formed are bent inwardly against the outer faces of the end walls to form reinforced edges 8, and the inturned portions of the end walls are then bent and crimped to form transversely V-shaped ribs 9 which are welded to the end walls, as shown at 10 in Figure 7. These ribs 9 greatly strengthen the end walls against crumpling when subjected to the weight of water in the trough and also form lower ends of the end walls with extensions which bear against the ground and prevent the end walls from being forced into the ground. The fact that the lower ends of the end walls are no thicker than the thickness of the sheet metal from which the walls are formed eliminates wide ground-engaging surfaces under which water could gather and cause rusing of the end walls.

It is desired to allow small animals to obtain water as well as large animals who drink from the trough. Therefore there has been provided an auxiliary 11 which has downwardly extending end walls 12 for resting upon the ground and preventing direct contact of the body portion of the trough with the ground. This auxiliary trough is located under one end portion of the main trough in such relation to one side of the main trough that a side portion of the auxiliary trough projects laterally from the main trough and small animals may readily drink from the auxiliary trough. A tube 13 extends from the inner side wall of the auxiliary trough and is mounted through an opening formed in a side wall of a chute 14 which extends vertically in the main trough. This chute is formed with a bottom 15 spaced upwardly from the ground and is welded through an opening 16 formed in the bottom of the main trough. The upper end portion of the chute projects above the main trough and is open at its upper end so that water may be easily poured into this chute to fill the auxiliary trough. If so desired a float controlled valve many be provided for the tube or pipe 13 and thus allow the chute to be filled with water above the level of the auxiliary trough and serve as a reservoir for the auxiliary trough.

Having thus described the invention, what is claimed is:

A water trough comprising a horizontal sheet metal body having a bottom and side walls, flat end walls of stiff sheet metal welded to ends of said body and being of greater width and depth than the body and having side portions projecting from opposite sides of the body and lower portions extending downwardly from the body and constituting supports for resting upon the ground and supporting the body in upwardly spaced relation to the ground, said end walls having opposite side edge portions folded inwardly to form reinforced side edges and then being bent outwardly and then inwardly to form outstanding transversely V-shaped ribs welded along their inner side edges to outer surfaces of the end walls and extending the full height of the end walls and at their lower ends being flush with lower edges of the said end walls and constituting members for resting upon the ground and preventing lower edge portions of the end walls from becoming embedded in the ground.

EMANUEL MURPHY.

REFERENCES CITED

The following references are of record in the file of this patent:

UNITED STATES PATENTS

| Number | Name | Date |
| --- | --- | --- |
| 266,533 | Sangster | Oct. 24, 1882 |
| 391,580 | Burton | Oct. 23, 1888 |
| 623,208 | Foltz | Apr. 18, 1899 |
| 906,396 | Drake et al. | Dec. 8, 1908 |
| 1,076,724 | Vertrees | Oct. 28, 1913 |
| 1,112,943 | Stone | Oct. 6, 1914 |
| 1,171,404 | Machay et al. | Feb. 8, 1916 |
| 1,252,861 | Terstegge | Jan. 8, 1918 |
| 1,346,307 | Eaton | July 13, 1920 |
| 1,349,841 | Luedke | Aug. 17, 1920 |
| 1,367,524 | Davis | Feb. 1, 1921 |
| 1,424,371 | Naylor et al. | Aug. 1, 1922 |
| 1,474,601 | Miller | Nov. 20, 1923 |
| 1,499,543 | Meister | July 1, 1924 |
| 1,777,577 | Ritchie | Oct. 7, 1930 |
| 1,954,646 | Pratt | Apr. 10, 1934 |